US012435887B2

(12) United States Patent
Havard, Jr. et al.

(10) Patent No.: US 12,435,887 B2
(45) Date of Patent: Oct. 7, 2025

(54) SLIDEABLE PROP ROD ASSEMBLIES FOR HINGED DOORS

(71) Applicant: Rheem Manufacturing Company, Atlanta, GA (US)

(72) Inventors: H. Gene Havard, Jr., Fort Smith, AR (US); John Rosco Jones, Spiro, OK (US)

(73) Assignee: Rheem Manufacturing Company, Atlanta, GA (US)

( * ) Notice: Subject to any disclaimer, the term of this patent is extended or adjusted under 35 U.S.C. 154(b) by 92 days.

(21) Appl. No.: 18/429,084

(22) Filed: Jan. 31, 2024

(65) Prior Publication Data

US 2024/0263810 A1 Aug. 8, 2024

Related U.S. Application Data

(60) Provisional application No. 63/442,856, filed on Feb. 2, 2023.

(51) Int. Cl.

*F24F 1/56* (2011.01)
*E05C 17/12* (2006.01)
*F24F 13/20* (2006.01)

(52) U.S. Cl.

CPC ................ *F24F 1/56* (2013.01); *E05C 17/12* (2013.01); *F24F 13/20* (2013.01); *F24F 2221/16* (2013.01)

(58) Field of Classification Search

None

See application file for complete search history.

(56) References Cited

U.S. PATENT DOCUMENTS 3,523,323 A * 8/1970 Jorgensen ................. E05D 3/06 16/302
5,931,554 A * 8/1999 Koopman ............. E05F 1/1253 312/319.2
8,491,070 B2 * 7/2013 Davis .................... F25D 23/028 312/405
11,072,952 B2 * 7/2021 Elkasevic ............... E05D 11/06
2004/0168284 A1 * 9/2004 Duffy ...................... E05C 17/30 16/83
2014/0317902 A1 * 10/2014 Helbig ............... H05K 7/20736 29/700
2015/0026922 A1 * 1/2015 Chao ..................... E05F 1/1066 16/70

(Continued)

FOREIGN PATENT DOCUMENTS

WO WO-2022149882 A1 * 7/2022 ............... E05D 3/06

*Primary Examiner* — Steven M Marsh

(74) *Attorney, Agent, or Firm* — Eversheds Sutherland (US) LLP

(57) ABSTRACT

Sliding prop rod assemblies are disclosed for hinged doors. Some embodiments may include heating, ventilation, and air conditioning systems that have a housing, a first door configured to provide access to an interior portion of the housing, and a first bracket coupled to the first door, the first bracket comprising a first aperture and a first slot. Embodiments may include a first rod coupled to the housing and configured to engage the first aperture when the first door is in an open position, and to engage the first slot when the first door is in a closed position, where the first rod prevents the first door from rotating when the first rod is engaged with the first aperture.

20 Claims, 5 Drawing Sheets

(56) References Cited

U.S. PATENT DOCUMENTS

| | | | | |
|---|---|---|---|---|
| 2015/0059126 | A1* | 3/2015 | Dubina | E05D 11/06<br>16/319 |
| 2017/0211817 | A1* | 7/2017 | Jadhav | E05D 3/14 |
| 2022/0228408 | A1* | 7/2022 | Steinhauser | E05C 17/025 |
| 2025/0020012 | A1* | 1/2025 | Caione | E05F 1/1091 |

* cited by examiner

SLIDEABLE PROP ROD ASSEMBLIES FOR HINGED DOORS

CROSS-REFERENCE TO RELATED APPLICATION

This application claims the benefit of U.S. Provisional Application No. 63/442,856, filed Feb. 2, 2023, the entirety of which is hereby incorporated by reference in its entirety.

FIELD

This disclosure relates generally to hinged doors and more particularly to hinged doors for heating, ventilation, and air conditioning (HVAC) systems.

BACKGROUND

HVAC units may have one or more doors that provide access to internal components of the HVAC unit or system. For example, one access door may provide access to filters used in the system, while another door may provide access to blowers or other hardware components. In some instances, such as for commercial HVAC systems, the systems may be in outdoor environments, such as on a rooftop, behind a building, and other outdoor environments. In such environments, doors of the HVAC system may be subject to outdoor ambient environment conditions, such as wind, rain, and so forth, which may cause issues for operators during maintenance and repair. For example, wind may cause an access door to slam closed and/or to bump against an operator during maintenance or repair work. Accordingly, slideable prop rod assemblies for hinged doors may be desired.

BRIEF DESCRIPTION OF THE DRAWINGS

The detailed description is set forth with reference to the accompanying drawings. In some instances, the use of the same reference numerals may indicate similar or identical items. Various embodiments may utilize elements and/or components other than those illustrated in the drawings, and some elements and/or components may not be present in various embodiments. Throughout this disclosure, depending on the context, singular and plural terminology may be used interchangeably.

DETAILED DESCRIPTION

Figure 1:
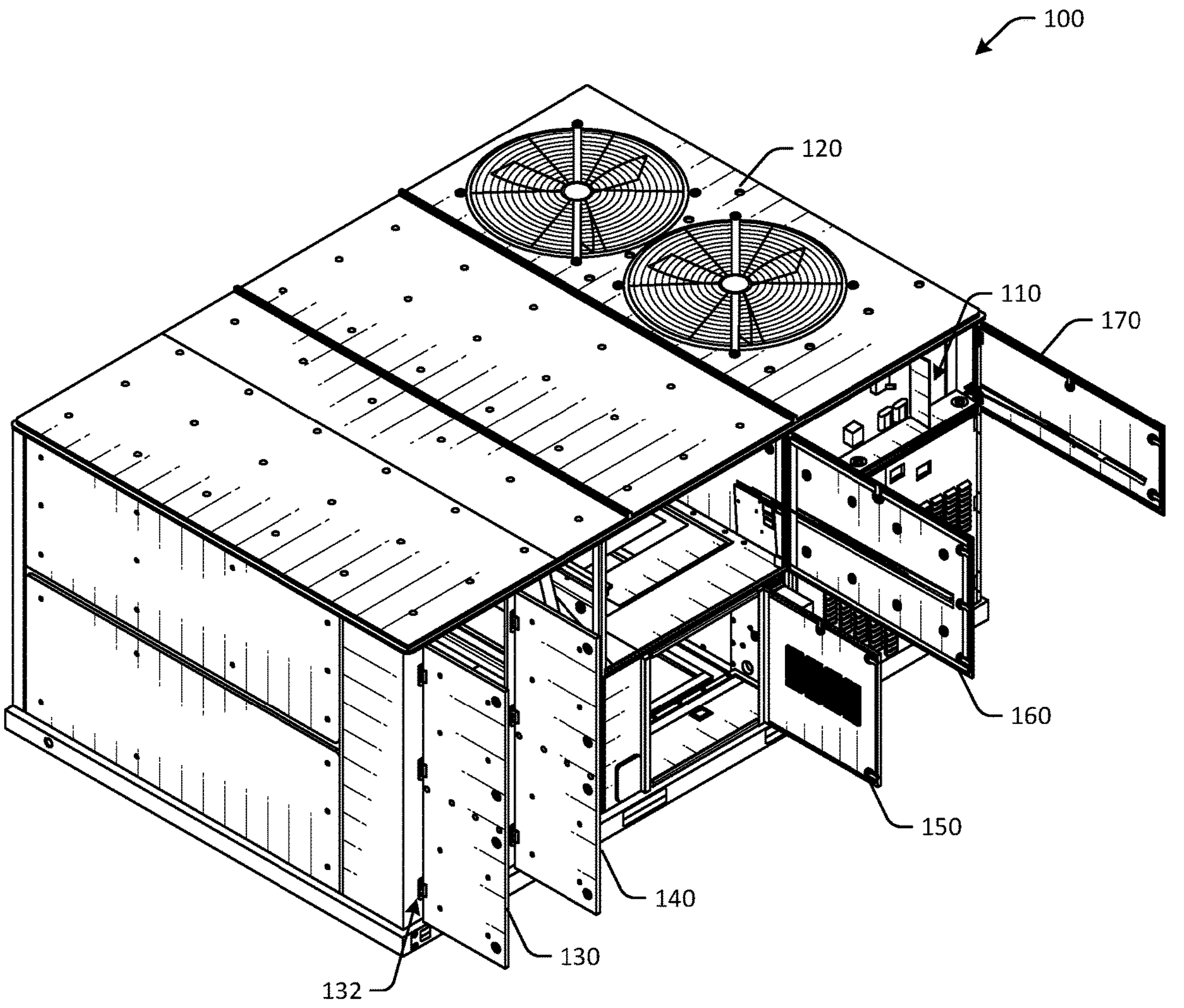
FIG. 1 illustrates an example HVAC system having hinged doors in accordance with one or more embodiments of the disclosure.

This disclosure relates generally to hinged doors and more particularly to slideable prop rod assemblies for hinged doors that are part of heating, ventilation, and air conditioning (HVAC) systems. HVAC systems may include heat pump systems, air conditioning systems, heating systems, air handler systems, and so forth for both commercial or residential use. Some embodiments include slideable prop rod assemblies that can be used to hold doors, such as access doors, panels, and so forth, in an open position, which may allow operators to access internal components of the HVAC system without obstruction. The slideable prop rod assemblies may not interfere with, or otherwise obstruct access to an interior of the HVAC system, and may allow for unobstructed movement of components into and out of the HVAC system, such as filters and other components. The slideable prop rod assemblies may therefore allow for improved access to the HVAC system during maintenance, repairs, etc.

In particular, for HVAC systems that are disposed in outdoor environments, such as on rooftops of buildings, in parking lots, and other outdoor environments, doors of the HVAC system may be pushed by wind and other environmental factors, thereby interfering with the ability of an operator to complete tasks on the HVAC system. The slideable prop rod assemblies described herein allow for hinged doors to remain in an open position regardless of environmental factors, and also for the hinged doors to be closed without interfering with other components of the system. Other solutions, such as lockable hinges, etc. may be problematic as a seal created when the door is closed may be compromised. Certain embodiments may be retrofitted to existing HVAC systems. In some embodiments, the prop rod may not be removable from the HVAC system, so as to avoid the prop rod from being misplaced. Accordingly, embodiments may provide advantages in certain operating conditions, such as conditions where preventing a door or panel of an HVAC system from closing would be beneficial.

In one embodiment, an HVAC system may include a housing, a first door configured to provide access to an interior portion of the housing, a first bracket coupled to the first door, the first bracket having a first aperture and a first slot, and a first rod coupled to the housing and configured to engage the first aperture when the first door is in an open position, and to engage the first slot when the first door is in a closed position. The first rod prevents the first door from rotating when the first rod is engaged with the first aperture. The first rod can be configured to move in both a horizontal direction and a vertical direction relative to the housing. The first rod may include an extended portion configured to slide along the first slot when the first door is rotated towards and away from the housing. The HVAC system may include a support plate coupled to a lower side of the first bracket, the support plate having a second aperture aligned with the first aperture. The first door may be configured to swing in a first direction. The HVAC system may include a second door configured to swing in a second direction, the second door configured to provide access to the interior portion of the housing, a second bracket coupled to the second door, the second bracket having a second aperture and a second slot, and a second rod removably coupled to the housing, the second rod configured to rotate in the second direction. The second rod is configured to engage the second aperture when the second door is in an open position, and to engage the second slot when the second door is in a closed position. In some embodiments, the first rod is at an offset angle relative to the first door when the first door is in the closed position. The HVAC system may include a hinge configured to couple the first door to the housing, where first rod is coupled to the housing adjacent to the hinge. The first rod may be configured to rotate more than 90 degrees in a horizontal direction with respect to the housing. The first door may be configured to swing at least 90 degrees from a closed position to an open position. The first door may be coupled to the housing via a free-swinging hinge. The HVAC system can be configured to be disposed in an outdoor environment, i.e., it may have a design suitable to withstand outdoor conditions, weather, etc.

In another embodiment, an outdoor HVAC system may include a housing, a first door, a first bracket coupled to the first door, the first bracket having a first aperture and a first slot, and a first rod coupled to the housing and configured to engage the first aperture when the first door is in an open position, and to engage the first slot when the first door is in a closed position. The first rod is configured to move in both a horizontal direction and a vertical direction relative to the housing. The HVAC system may include a support plate coupled to a lower side of the first bracket, the support plate having a second aperture aligned with the first aperture. The first door can be configured to swing in a first direction, and the HVAC system may include a second door configured to swing in a second direction, the second door configured to provide access to the interior portion of the housing, a second bracket coupled to the second door, the second bracket having a second aperture and a second slot, and a second rod removably coupled to the housing, the second rod configured to rotate in the second direction, where the second rod is configured to engage the second aperture when the second door is in an open position, and to engage the second slot when the second door is in a closed position. The HVAC system may be configured to be disposed on a rooftop structure, i.e., it may have a design suitable to withstand outdoor and rooftop conditions, and to be installed on a rooftop.

In another embodiment, an HVAC system may include a housing, a first door configured to provide access to an interior portion of the housing, where the first door is configured to swing in a first direction, a first bracket coupled to the first door, the first bracket having a first aperture and a first slot, a first rod coupled to the housing and configured to engage the first aperture when the first door is in an open position, and to engage the first slot when the first door is in a closed position, where the first rod prevents the first door from rotating when the first rod is engaged with the first aperture, a second door configured to swing in a second direction, the second door configured to provide access to the interior portion of the housing, a second bracket coupled to the second door, the second bracket having a second aperture and a second slot, and a second rod removably coupled to the housing, the second rod configured to rotate in the second direction, where the second rod is configured to engage the second aperture when the second door is in an open position, and to engage the second slot when the second door is in a closed position.

Referring to FIG. 1, FIG. 1 illustrates an example HVAC system 100 having hinged doors in accordance with one or more embodiments of the disclosure. Other embodiments may have different configurations and/or may include additional, fewer, or different components. Some components may not be depicted at scale relative to other drawings.

The HVAC system 100 may be configured to be disposed in an outdoor environment, such as on a building rooftop, a parking lot, yard, or other environment. The HVAC system 100 may be a commercial grade HVAC system. The HVAC system 100 may include a number of access panels or doors that can be used to access an interior 110 of the HVAC system. For example, the HVAC system 100 may include a housing 120, and a number of doors coupled to the housing 120. In FIG. 1, the HVAC system 100 includes a first door 130, a second door 140, a third door 150, a fourth door 160, a fifth door 170, and so forth. Any number of doors or panels may be included. Some or all of the doors may be hinged doors, e.g., doors that are connected to the housing 120 via one or more hinges, such as via a free-swinging hinge. For example, the first door 130 may be coupled to the HVAC system 100 and/or the housing 120 of the HVAC system 100 via a free-swinging hinge 132. The free-swinging hinge 132 may allow the first door 130 to rotate towards and away from the housing 120 without any predetermined stop points (e.g., no detents and/or hold positions, etc.). Accordingly, the first door 130 may swing as a result of any external force, such as wind.

As depicted in FIG. 1, some of the doors may swing in a first direction, and other doors may swing in an opposite direction. For example, the first door 130 may swing toward a left side of the housing 120, and the third door 150 may swing towards a right side of the housing 120. In other embodiments, doors may swing up and/or down instead of laterally.

The HVAC system 100 may include one or more slideable prop rod assemblies coupled to the doors, where the slideable prop rod assemblies are configured to hold the respective door in an open position. In some embodiments, one slideable prop rod assembly may be used for an individual door, whereas in other embodiments, more than one slideable prop rod assembly may be used for an individual door.

Figure 2A:
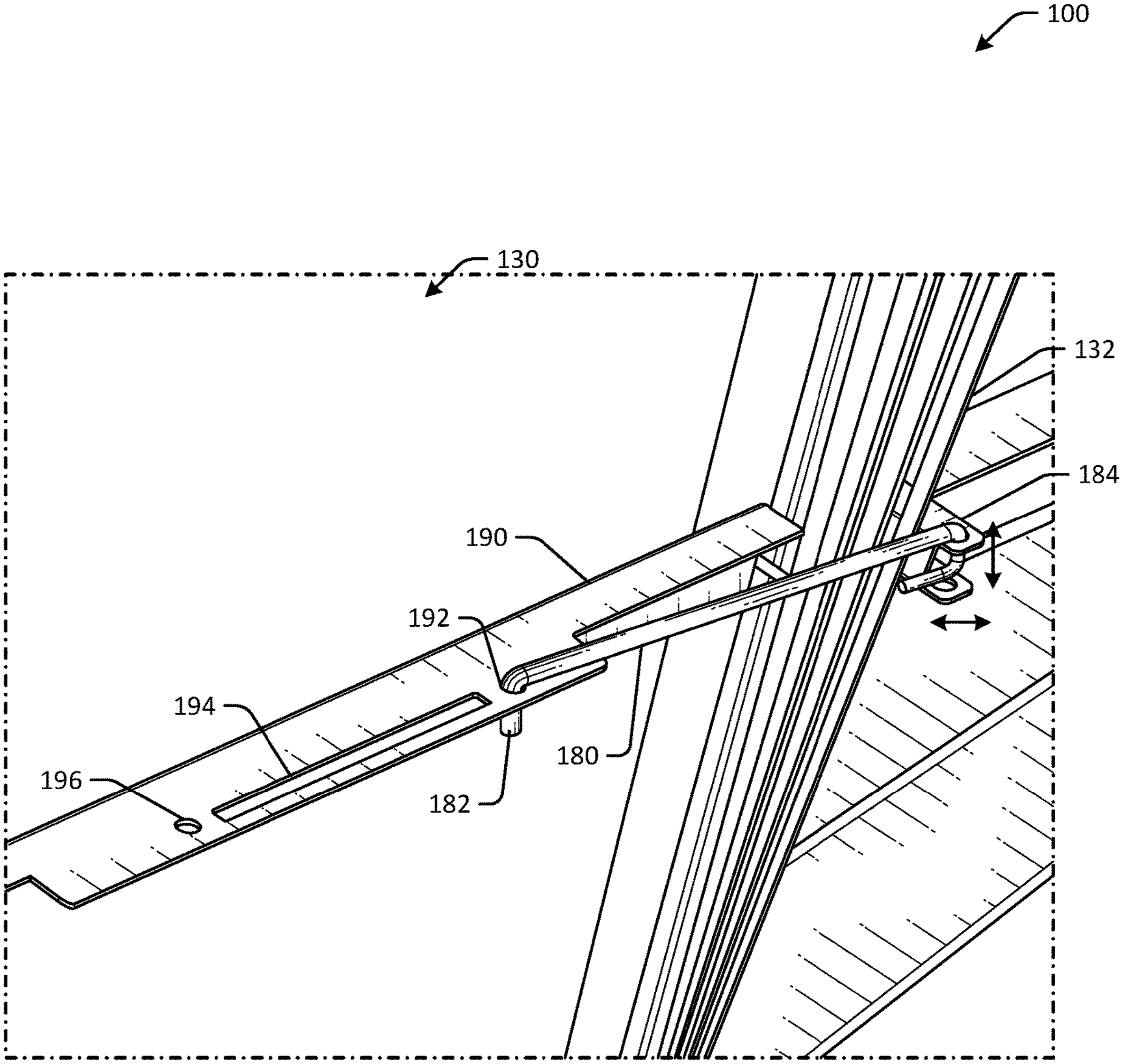
FIG. 2A illustrates a partial view of a hinged door of the HVAC system of FIG. 1 held in an open position by a slideable prop rod assembly in accordance with one or more embodiments of the disclosure.
Figure 2B:
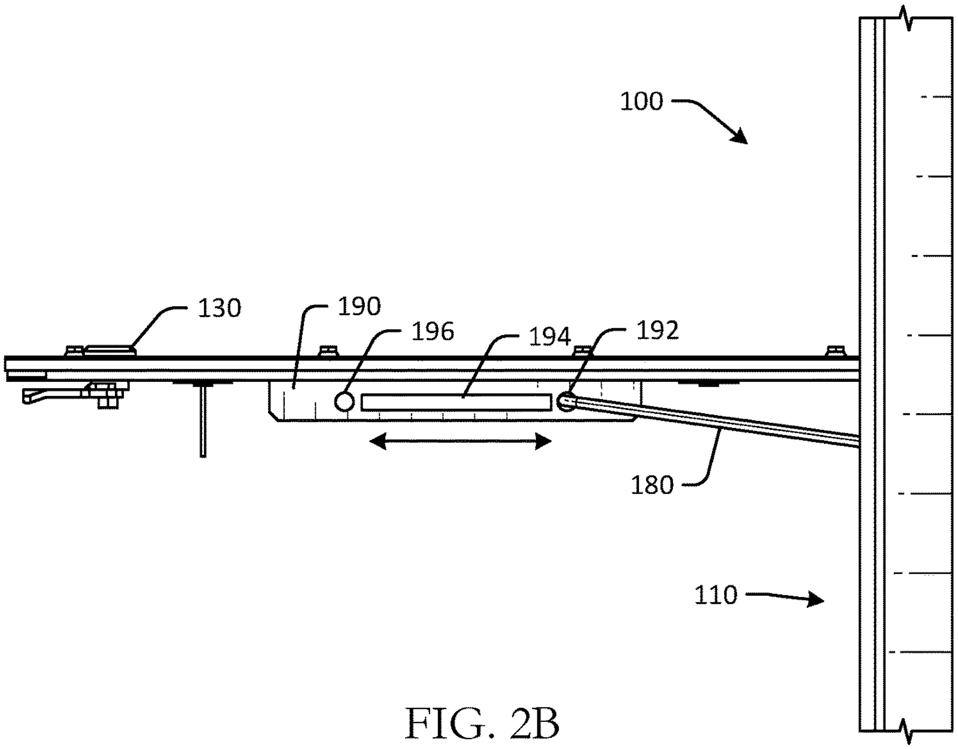
FIG. 2B illustrates a top view of the hinged door and slideable prop rod assembly of FIG. 2A in accordance with one or more embodiments of the disclosure.
Figure 2C:
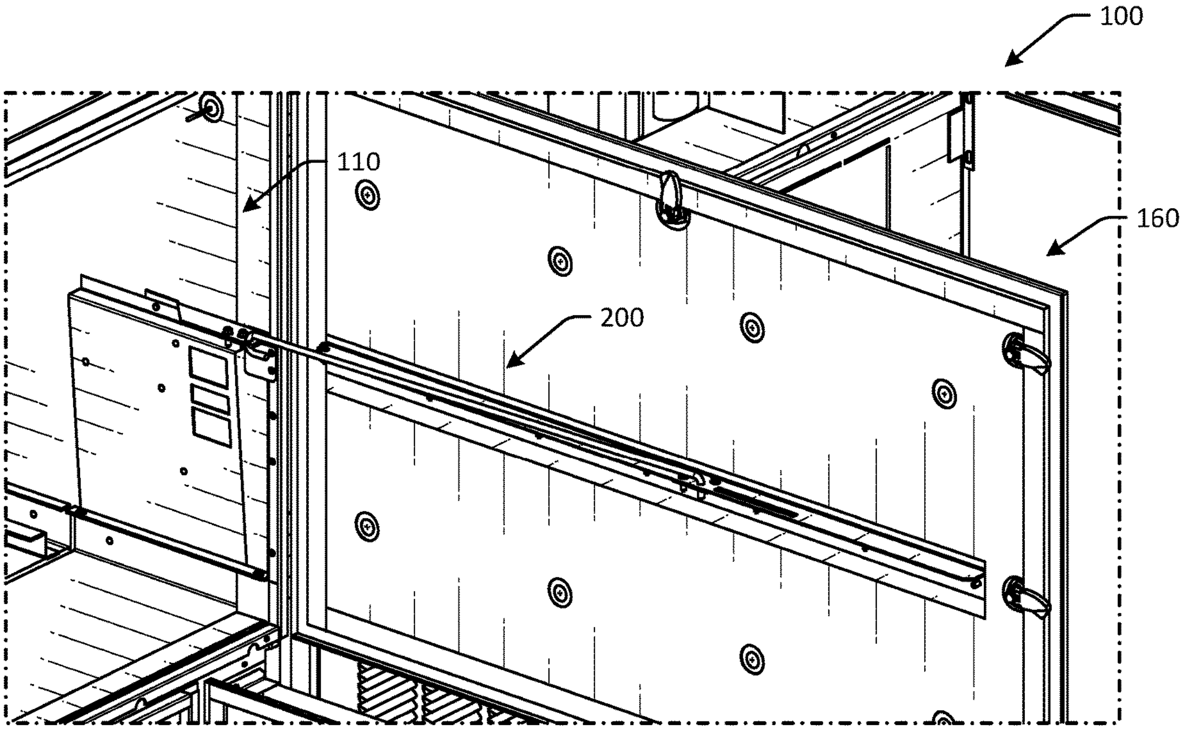
FIG. 2C illustrates a partial view of another hinged door of the HVAC system of FIG. 1 held in an open position by a slideable prop rod assembly in accordance with one or more embodiments of the disclosure.

In FIGS. 2A-2C, slideable prop rod assemblies are depicted holding various doors of the HVAC system 100 of FIG. 1 in an open position. FIG. 2A illustrates an upper perspective partial view of the first door 130 of the HVAC system of FIG. 1 held in an open position by a slideable prop rod assembly in accordance with one or more embodiments of the disclosure. FIG. 2B illustrates a top view of the first door 130 and slideable prop rod assembly of FIG. 2A in accordance with one or more embodiments of the disclosure. FIG. 2C illustrates a partial view of the fourth door 160 of the HVAC system 100 of FIG. 1 held in an open position by a slideable prop rod assembly 200 in accordance with one or more embodiments of the disclosure. Other embodiments may have different configurations and/or may include additional, fewer, or different components. Some components may not be depicted at scale relative to other drawings.

The HVAC system 100 may include the housing 120 and the first door 130 configured to provide access to the interior portion 110 of the housing 120 and/or the interior of the HVAC system 100. The HVAC system 100 may include a first slideable prop rod assembly configured to hold the first door 130 in an open position, as depicted in FIGS. 2A-2B. The hinge 132 may be configured to couple the first door 130 to the housing 120, and the first rod 180 may be coupled to the housing 120 adjacent to the hinge 132, such as at frame attachment 184. The hinge 132 may be a free-swinging hinge.

The slideable prop rod assembly may include a first bracket 190 coupled to the first door 130, such as coupled to an inside-facing side of the first door 130. The first bracket 190 may include a first aperture 192, a first slot 194, and an optional second aperture 196. The slideable prop rod assembly may include a first rod 180 coupled to the housing 120, such as at frame attachment 184, that may be configured to engage the first aperture 192 when the first door 130 is in an open position. For example, an operator may place an extended portion 182 of the first rod 180 into the first aperture 192 when the first door 130 is open in order to prevent the first door 130 from swinging and/or to hold the first door 130 in the open position. The first rod 180 may be moved to engage the first slot 194 when the first door 130 is in a closed position or when the operator desires to close the first door 130. For example, the extended portion 182 may be lifted and removed from the first aperture 192, and engaged with the first slot 194 to allow the first door 130 to close. The first rod 180 therefore prevents the first door 130 from rotating about the hinged axis when the first rod 180 is engaged with the first aperture 192. As depicted by arrows in FIG. 2A adjacent to the frame attachment 184, the first rod 180 may be configured to move in both a horizontal direction (e.g. laterally with respect to the frame or housing 120) and a vertical direction (e.g. vertically with respect to the frame or housing 120) relative to the housing 120, so as to provide the operator flexibility in moving the first rod 180 between the first aperture 192 and the first slot 194 of the first bracket 190.

As depicted in the top view of FIG. 2B, the extended portion 182 of the first rod 180 may slide along the first slot 194 when the first door 130 is pushed toward the housing 120, so as to allow the first door 130 to be closed without interference. In some embodiments, the first rod 180 may be configured to rotate more than 90 degrees in a horizontal direction with respect to the housing 120, as visible in the top view of FIG. 2B, where 90 degrees is a horizontal plane. Similarly, the first door 130 may be configured to swing at least 90 degrees from a closed position to an open position with respect to the housing 120 in some embodiments.

In FIG. 2C, the HVAC system 100 may include more than one slideable prop rod assembly. For example, the fourth door 160 may be configured to swing in a second direction opposite the first door 130, where the fourth door 160 may be configured to provide access to the interior 110 portion of the housing 120 and/or HVAC system 100. The HVAC system 100 may include a second slideable prop rod assembly 200 that includes a second bracket coupled to the fifth door, the second bracket having a second aperture and a second slot, a second rod that is optionally removably coupled to the housing 120, where the second rod may be configured to rotate in the second direction, and where the second rod is configured to engage the second aperture when the second door is in an open position, and to engage the second slot when the second door is in a closed position. Any number of doors and/or slideable prop rod assemblies may be included.

Figure 3A:
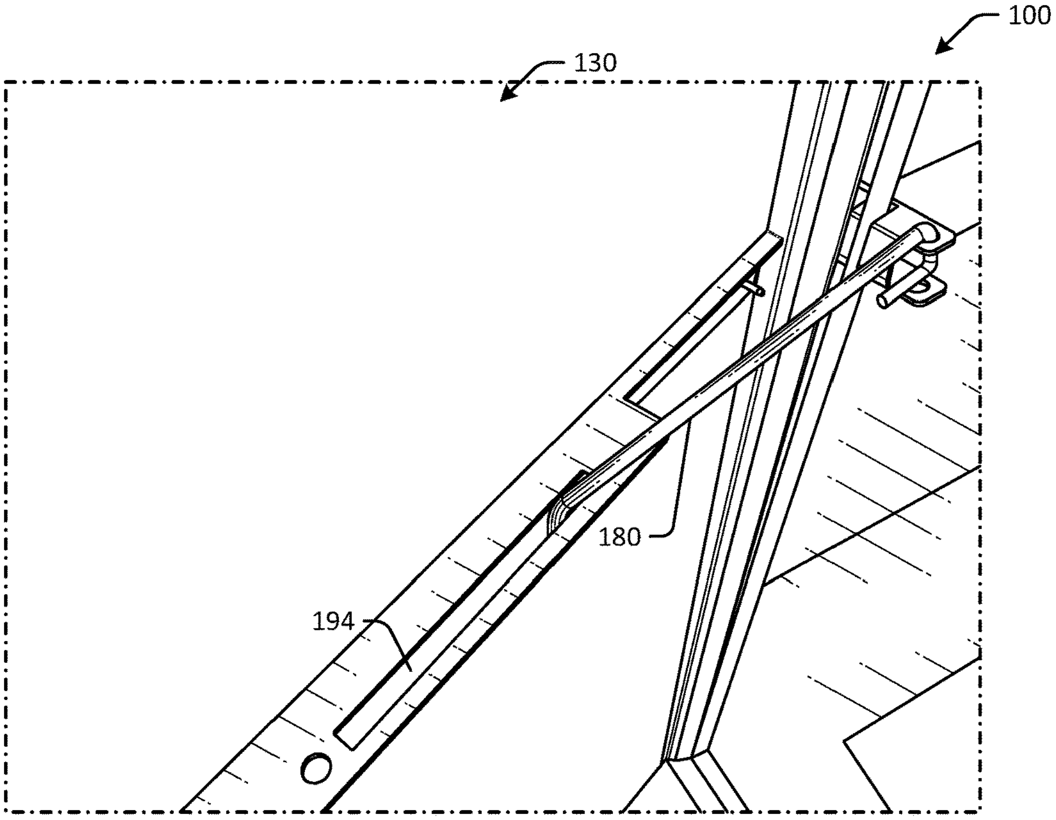
FIGS. 3A-3B illustrate the slideable prop rod assembly of FIGS. 2A-2B in a sliding configuration in accordance with one or more embodiments of the present disclosure.
Figure 3B:
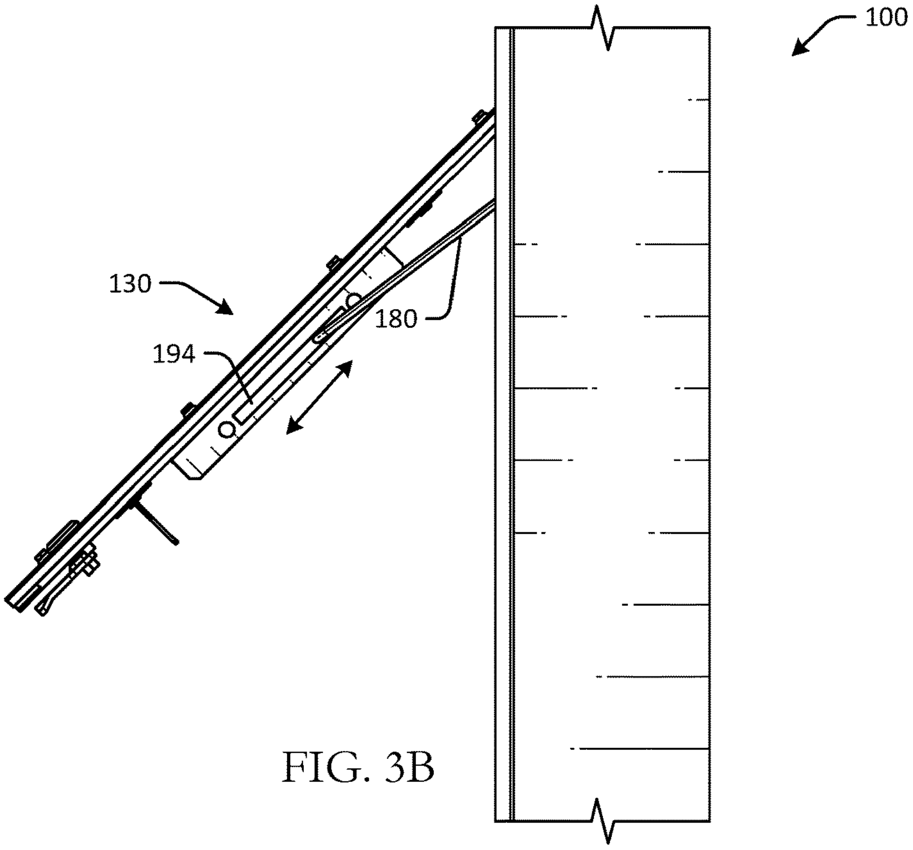

FIGS. 3A-3B illustrate the slideable prop rod assembly of FIGS. 2A-2B in a sliding configuration in accordance with one or more embodiments of the present disclosure. Other embodiments may have different configurations and/or may include additional, fewer, or different components. Some components may not be depicted at scale relative to other drawings.

In FIGS. 3A-3B, the first rod 180 may be positioned such that the extended portion 182 engages the first slot 194 instead of the first aperture 192. The extended portion 182 may slide along the first slot 194 when the first door 130 is rotated towards and/or away from the housing 120. As a result, the first rod 180 may not obstruct access to the interior 110 of the HVAC system 100.

Figure 4:
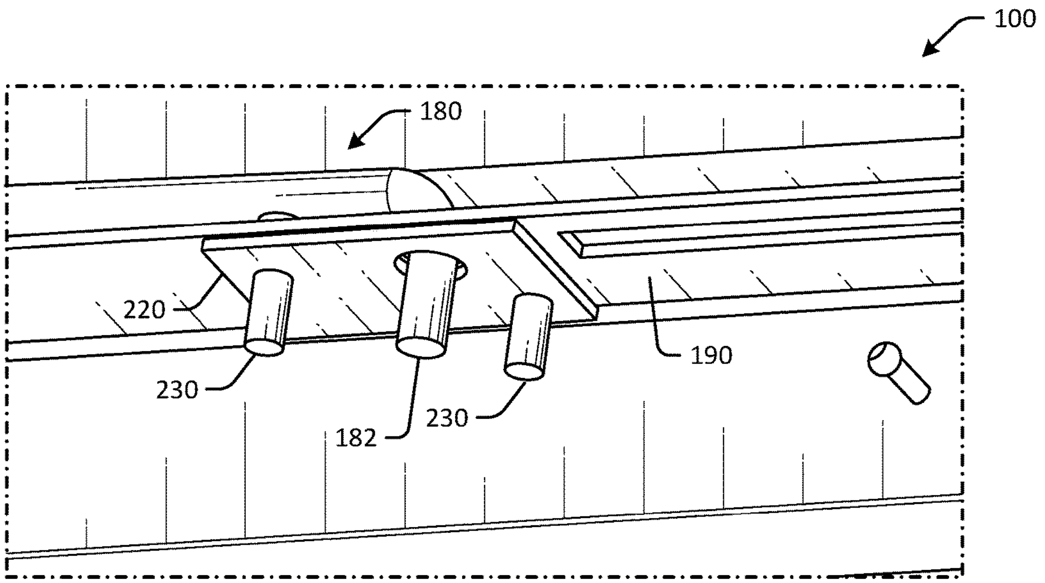
FIG. 4 illustrates an example support component coupled to a bracket of a slideable prop rod assembly in accordance with one or more embodiments of the present disclosure.

FIG. 4 illustrates an example support plate 220 coupled to the bracket 190 of the slideable prop rod assembly of FIGS. 2A-2B in accordance with one or more embodiments of the present disclosure. Other embodiments may have different configurations and/or may include additional, fewer, or different components. Some components may not be depicted at scale relative to other drawings.

Some embodiments may include the support plate 220, which may be coupled to a lower side of the first bracket 190. The support plate 220 may have a second aperture aligned with the first aperture 192, such that the extended portion 182 of the first rod passes through both the first bracket 190 and the support plate 220. The support plate 220 may provide additional rigidity and added strength to prevent rotation of the first door 130. The HVAC system 100 may include one or more pins 230 that couple the support plate 220 to the first bracket 190, and also provide rigidity against shear or rotational movement of the support plate 220.

Figure 5:
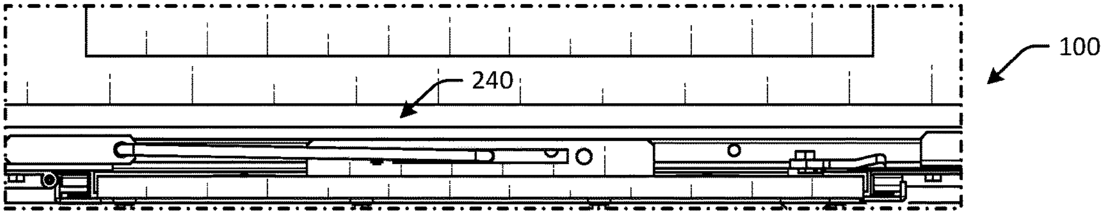
FIG. 5 illustrates a top view of a hinged door in a closed configuration with a slideable prop rod assembly in accordance with one or more embodiments of the present disclosure.

FIG. 5 illustrates a top view of a hinged door in a closed configuration 240 with a slideable prop rod assembly in accordance with one or more embodiments of the present disclosure. Other embodiments may have different configurations and/or may include additional, fewer, or different components. Some components may not be depicted at scale relative to other drawings.

As depicted in FIG. 5, a rod 240 of a slideable prop rod assembly may be disposed at an offset angle relative to a door, such as the first door 130, when the door is in the closed position. In this manner, the rod may not consume interior space within the HVAC system beyond that already consumed by the door frame.

Figure 6:
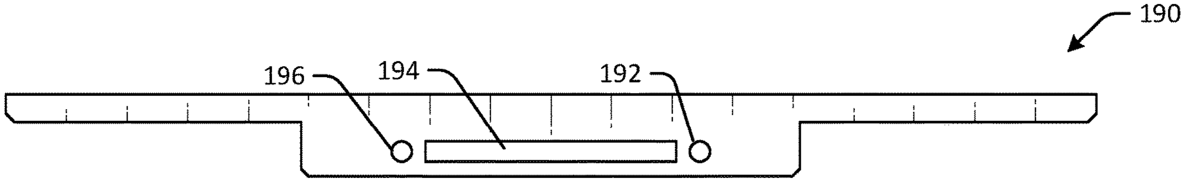
FIG. 6 illustrates a bracket of a slideable prop rod assembly in an isolated view in accordance with one or more embodiments of the present disclosure.

FIG. 6 illustrates the first bracket 190 of a slideable prop rod assembly in an isolated view in accordance with one or more embodiments of the present disclosure. Other embodiments may have different configurations and/or may include additional, fewer, or different components. Some components may not be depicted at scale relative to other drawings. Dimensions of the first bracket 190 may vary based on the particular configuration of the corresponding rod that will engage the first bracket components.

It should be apparent that the foregoing relates only to certain embodiments of the present disclosure and that numerous changes and modifications may be made herein by one of ordinary skill in the art without departing from the general spirit and scope of the disclosure.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may" unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A heating, ventilation, and air conditioning (HVAC) system comprising:
a housing;
a first door configured to provide access to an interior portion of the housing;
a first bracket coupled to the first door, the first bracket comprising a first aperture and a first slot; and
a first rod coupled to the housing and configured to engage the first aperture when the first door is in an open position, and to engage the first slot when the first door is in a closed position;
wherein the first rod prevents the first door from rotating when the first rod is engaged with the first aperture.

2. The HVAC system of claim 1, wherein the first rod is configured to move in both a horizontal direction and a vertical direction relative to the housing.

3. The HVAC system of claim 1, wherein the first rod comprises an extended portion configured to slide along the first slot when the first door is rotated towards and away from the housing.

4. The HVAC system of claim 1, further comprising:
a support plate coupled to a lower side of the first bracket, the support plate comprising a second aperture aligned with the first aperture.

5. The HVAC system of claim 1, wherein the first door is configured to swing in a first direction, the HVAC system further comprising:
a second door configured to swing in a second direction, the second door configured to provide access to the interior portion of the housing;
a second bracket coupled to the second door, the second bracket comprising a second aperture and a second slot;
a second rod removably coupled to the housing, the second rod configured to rotate in the second direction, wherein the second rod is configured to engage the second aperture when the second door is in an open position, and to engage the second slot when the second door is in a closed position.

6. The HVAC system of claim 1, wherein the first rod is at an offset angle relative to the first door when the first door is in the closed position.

7. The HVAC system of claim 1, further comprising:
a hinge configured to couple the first door to the housing;
wherein the first rod is coupled to the housing adjacent to the hinge.

8. The HVAC system of claim 1, wherein the first rod is configured to rotate more than 90 degrees in a horizontal direction with respect to the housing.

9. The HVAC system of claim 1, wherein the first door is configured to swing at least 90 degrees from a closed position to an open position.

10. The HVAC system of claim 1, wherein the first door is coupled to the housing via a free-swinging hinge.

11. The HVAC system of claim 10, wherein the HVAC system is configured to be disposed in an outdoor environment.

12. An outdoor heating, ventilation, and air conditioning (HVAC) system comprising:
a housing configured to be disposed in an outdoor environment;
a first door;
a first bracket coupled to the first door, the first bracket comprising a first aperture and a first slot; and
a first rod coupled to the housing and configured to engage the first aperture when the first door is in an open position, and to engage the first slot when the first door is in a closed position;
wherein the first rod is configured to move in both a horizontal direction and a vertical direction relative to the housing.

13. The HVAC system of claim 12, further comprising:
a support plate coupled to a lower side of the first bracket, the support plate comprising a second aperture aligned with the first aperture.

14. The HVAC system of claim 12, wherein the first door is configured to swing in a first direction, the HVAC system further comprising:
a second door configured to swing in a second direction, the second door configured to provide access to the interior portion of the housing;
a second bracket coupled to the second door, the second bracket comprising a second aperture and a second slot;
a second rod removably coupled to the housing, the second rod configured to rotate in the second direction, wherein the second rod is configured to engage the second aperture when the second door is in an open position, and to engage the second slot when the second door is in a closed position.

15. The HVAC system of claim 12, wherein the first rod is at an offset angle relative to the first door when the first door is in the closed position.

16. The HVAC system of claim 12, further comprising:
a hinge configured to couple the first door to the housing;
wherein the first rod is coupled to the housing adjacent to the hinge.

17. The HVAC system of claim 12, wherein the first rod is configured to rotate more than 90 degrees in a horizontal direction with respect to the housing, and wherein the first door is configured to swing at least 90 degrees from a closed position to an open position.

18. The HVAC system of claim 12, wherein the first door is coupled to the housing via a free-swinging hinge.

19. The HVAC system of claim 12, wherein the HVAC system is configured to be disposed on a rooftop structure.

20. A heating, ventilation, and air conditioning (HVAC) system comprising:
a housing;
a first door configured to provide access to an interior portion of the housing, wherein the first door is configured to swing in a first direction;
a first bracket coupled to the first door, the first bracket comprising a first aperture and a first slot;
a first rod coupled to the housing and configured to engage the first aperture when the first door is in an open position, and to engage the first slot when the first door is in a closed position, wherein the first rod prevents the first door from rotating when the first rod is engaged with the first aperture;
a second door configured to swing in a second direction, the second door configured to provide access to the interior portion of the housing;
a second bracket coupled to the second door, the second bracket comprising a second aperture and a second slot;
a second rod removably coupled to the housing, the second rod configured to rotate in the second direction, wherein the second rod is configured to engage the second aperture when the second door is in an open position, and to engage the second slot when the second door is in a closed position.

* * * * *